United States Patent
Pu

(10) Patent No.: US 12,271,594 B2
(45) Date of Patent: Apr. 8, 2025

(54) DATA STORAGE METHOD AND APPARATUS

(71) Applicant: HUAWEI TECHNOLOGIES CO., LTD., Guangdong (CN)

(72) Inventor: Guiyou Pu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 15 days.

(21) Appl. No.: 18/317,427

(22) Filed: May 15, 2023

(65) Prior Publication Data
US 2023/0305707 A1 Sep. 28, 2023

Related U.S. Application Data

(63) Continuation of application No. PCT/CN2021/100789, filed on Jun. 18, 2021.

(30) Foreign Application Priority Data

Nov. 17, 2020 (CN) .......................... 202011290060.3
Jan. 7, 2021 (CN) .......................... 202110018308.9

(51) Int. Cl.
*G06F 3/06* (2006.01)
(52) U.S. Cl.
CPC ............ *G06F 3/061* (2013.01); *G06F 3/0653* (2013.01); *G06F 3/0659* (2013.01); *G06F 3/0685* (2013.01); *G06F 3/0616* (2013.01)
(58) Field of Classification Search
CPC ...... G06F 3/061; G06F 3/0653; G06F 3/0659; G06F 3/0685; G06F 3/0616
See application file for complete search history.

(56) References Cited

U.S. PATENT DOCUMENTS

| 7,631,023 B1 | 12/2009 | Kaiser et al. |
| 2015/0160858 A1* | 6/2015 | Okada ................... G06F 3/0665 711/114 |
| 2016/0196064 A1* | 7/2016 | Noda ................... G06F 12/0246 711/101 |
| 2018/0067660 A1* | 3/2018 | Yamamoto ............ G06F 3/0641 |

FOREIGN PATENT DOCUMENTS

| CN | 110083310 A | 8/2019 |
| CN | 110858122 A | 3/2020 |

OTHER PUBLICATIONS

Extended European Search Report in European Appln No. 21893376.0, dated Mar. 19, 2024, 11 pages.
International Search Report and Written Opinion in International Appln. No. PCT/CN2021/100789, mailed on Sep. 22, 2021, 14 pages (with English translation).

* cited by examiner

*Primary Examiner* — Edward J Dudek, Jr.
(74) *Attorney, Agent, or Firm* — Fish & Richardson P.C.

(57) ABSTRACT

A data storage method and apparatus are provided. The method includes: obtaining running parameters of a plurality of hard disks, where the running parameters of the plurality of hard disks comprise information for measuring individual differences of the plurality of hard disks in performance; selecting at least one target hard disk based on the running parameters of the plurality of hard disks; and writing data into the target hard disk.

19 Claims, 2 Drawing Sheets

| Running parameter of a hard disk | | | | | |
|---|---|---|---|---|---|
| Remaining space of the hard disk | Remaining life of the hard disk | Write speed of the hard disk | Read speed of the hard disk | IOPS | Through put |

FIG. 3

| Classify a plurality of hard disks into different levels based on remaining life | | |
|---|---|---|
| First level (remaining write amount of a hard disk ≤ 100 TB) | Second level (100 TB < remaining write amount of a hard disk ≤ 500 TB) | Third level (remaining write amount of a hard disk > 500 TB) |
| One or more hard disks | One or more hard disks | One or more hard disks |

FIG. 4

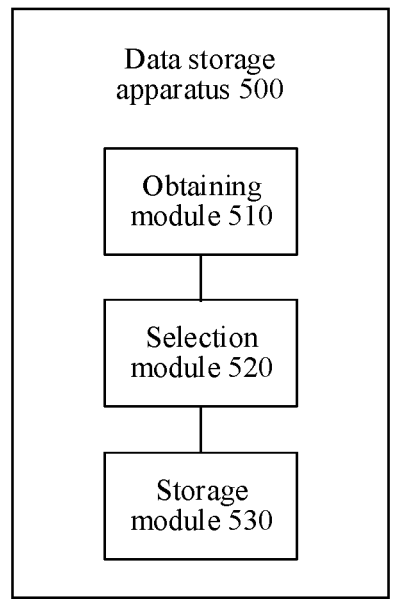

FIG. 5

DATA STORAGE METHOD AND APPARATUS

CROSS-REFERENCE TO RELATED APPLICATIONS

This application is a continuation of International Application No. PCT/CN2021/100789, filed on Jun. 18, 2021, which claims priority to Chinese Patent Application No. 202110018308.9, filed on Jan. 7, 2021 and Chinese Patent Application No. 202011290060.3, filed on Nov. 17, 2020. All of the aforementioned patent applications are hereby incorporated by reference in their entireties.

TECHNICAL FIELD

This application relates to the storage field, and more specifically, to a data storage method and apparatus.

BACKGROUND

Data storage is one of important parts of a computing device. The data storage may provide a capability of writing information (for example, a program and data) for the computing device, or may further provide a capability of reading information (for example, a program and data) for the computing device, to implement an information storage function of the computing device.

A storage system uses a large quantity of hard disks to provide external data storage services. Therefore, efficient management and use of the hard disks is one of key technologies of the storage system. A related hard disk management solution is simple, and mainly implements classified management based on different types of hard disks. For example, the hard disks are classified into a solid-state drive, a mechanical hard disk, and the like based on the types of the hard disks, and different types of hard disks are used to store different types of data. However, in the foregoing related technical solution, unified management and simple type classification of hard disks cannot effectively distinguish between performance differences existing during use of the hard disks. Consequently, utilization efficiency of the hard disks is reduced, and overall performance of the storage system is reduced.

SUMMARY

This application provides a data storage method and apparatus, so that individual differences between hard disks can be effectively distinguished, utilization efficiency of the hard disks is improved, and therefore overall performance of a storage system can be improved.

According to a first aspect, a data storage method is provided. The method includes: obtaining running parameters of a plurality of hard disks, where the running parameters of the plurality of hard disks are used for measuring individual differences of the plurality of hard disks in performance; selecting at least one target hard disk based on the running parameters of the plurality of hard disks; and writing data into the target hard disk.

In the foregoing technical solution, the individual differences between the hard disks may be effectively distinguished based on the individual differences of the plurality of hard disks in performance, to avoid unnecessary replacement of the hard disks, improve utilization efficiency of the hard disks, and improve overall performance of a storage system.

With reference to the first aspect, in some implementations of the first aspect, the individual differences of the plurality of hard disks in performance result from any one of the following several cases:

Types of media of the plurality of hard disks are the same, and vendors of the plurality of hard disks are different;

types of media and vendors of the plurality of hard disks are the same, and factory batches of the plurality of hard disks are different;

types of media, vendors, and factory batches of the plurality of hard disks are the same, and settings of the plurality of hard disks are different;

types of media, vendors, factory batches, and settings of the plurality of hard disks are the same, and use environments of the plurality of hard disks are different; or types of media, vendors, factory batches, settings, and use environments of the plurality of hard disks are the same, and the plurality of hard disks have performance differences during running.

With reference to the first aspect, in some implementations of the first aspect, when the plurality of hard disks are all flash media, that types of media are the same includes: storage densities/granularities of minimum memory cells are the same.

With reference to the first aspect, in some implementations of the first aspect, the performance includes read/write performance and/or life.

With reference to the first aspect, in some implementations of the first aspect, the running parameter of the hard disk includes a combination of any one or more of the following: remaining space of the hard disk, remaining life of the hard disk, a write speed of the hard disk, or a read speed of the hard disk.

With reference to the first aspect, in some implementations of the first aspect, the target hard disk is a hard disk whose remaining life exceeds a life threshold in the plurality of hard disks.

In the foregoing technical solution, the data may be written into a hard disk whose life is long. In this way, overall life of the storage system can be prolonged.

With reference to the first aspect, in some implementations of the first aspect, the target hard disk is a hard disk whose write speed exceeds a write performance threshold in the plurality of hard disks.

With reference to the first aspect, in some implementations of the first aspect, the target hard disk is a hard disk whose read speed exceeds a read performance threshold in the plurality of hard disks.

In the foregoing technical solution, the hard disk whose read speed exceeds the read performance threshold may be further used as the target hard disk. In this way, if there is a high probability that the data written into the target hard disk is read again subsequently, read performance of the data can be ensured, and therefore the overall performance of the storage system is improved.

With reference to the first aspect, in some implementations of the first aspect, the at least one target hard disk is selected from the plurality of hard disks based on the running parameters of the plurality of hard disks and an attribute of the data.

In the foregoing technical solution, the target hard disk may be selected with reference to the attribute of the data and the running parameters of the hard disks. In this way, the individual differences between the hard disks can be better distinguished based on the attribute of the data, the utilization efficiency of the hard disks is improved, and therefore the overall performance of the storage system is improved.

With reference to the first aspect, in some implementations of the first aspect, if the data has a write-hot attribute, the target hard disk is the hard disk whose remaining life exceeds the life threshold in the plurality of hard disks.

It should be understood that, that the data has a write-hot attribute may be that a probability that the data is modified or deleted within specific duration is greater than a first threshold.

In the foregoing technical solution, data that is frequently modified or deleted within the specific duration may be stored in a hard disk whose remaining life is long. In this way, the overall life of the storage system can be prolonged.

With reference to the first aspect, in some implementations of the first aspect, the target hard disk is the hard disk whose write speed exceeds the write performance threshold in the plurality of hard disks.

With reference to the first aspect, in some implementations of the first aspect, if the data has a read-hot attribute, the target hard disk is the hard disk whose read speed exceeds the read performance threshold in the plurality of hard disks.

It should be understood that, that the data has a read-hot attribute may be that a probability that the data is read again within the specific duration is greater than a second threshold.

In the foregoing technical solution, data with a high probability of being read again subsequently is stored in a hard disk whose read performance is good. In this way, read performance of the data can be ensured, and therefore the overall performance of the storage system is improved.

According to a second aspect, a data storage apparatus is provided, including an obtaining module, a selection module, and a storage module.

The obtaining module is configured to obtain running parameters of a plurality of hard disks. The running parameters of the plurality of hard disks are used for measuring individual differences of the plurality of hard disks in performance.

The selection module is configured to select at least one target hard disk based on the running parameters of the plurality of hard disks.

The storage module is configured to write data into the target hard disk.

With reference to the second aspect, in some implementations of the second aspect, the individual differences of the plurality of hard disks in performance result from any one of the following several cases:

Types of media of the plurality of hard disks are the same, and vendors of the plurality of hard disks are different;

types of media and vendors of the plurality of hard disks are the same, and factory batches of the plurality of hard disks are different;

types of media, vendors, and factory batches of the plurality of hard disks are the same, and settings of the plurality of hard disks are different;

types of media, vendors, factory batches, and settings of the plurality of hard disks are the same, and use environments of the plurality of hard disks are different; or types of media, vendors, factory batches, settings, and use environments of the plurality of hard disks are the same, and the plurality of hard disks have performance differences during running.

With reference to the second aspect, in some implementations of the second aspect, when the plurality of hard disks are all flash media, that types of media are the same includes: storage densities/granularities of minimum memory cells are the same.

With reference to the second aspect, in some implementations of the second aspect, the performance includes read/write performance and/or life.

With reference to the second aspect, in some implementations of the second aspect, the running parameter of the hard disk includes a combination of any one or more of the following: remaining space of the hard disk, remaining life of the hard disk, a write speed of the hard disk, or a read speed of the hard disk.

With reference to the second aspect, in some implementations of the second aspect, the target hard disk is a hard disk whose remaining life exceeds a life threshold in the plurality of hard disks.

With reference to the second aspect, in some implementations of the second aspect, the target hard disk is a hard disk whose write speed exceeds a write performance threshold in the plurality of hard disks.

With reference to the second aspect, in some implementations of the second aspect, the target hard disk is a hard disk whose read speed exceeds a read performance threshold in the plurality of hard disks.

With reference to the second aspect, in some implementations of the second aspect, the selection module is specifically configured to select the at least one target hard disk from the plurality of hard disks based on the running parameters of the plurality of hard disks and an attribute of the data.

With reference to the second aspect, in some implementations of the second aspect, if the data has a write-hot attribute, the target hard disk is the hard disk whose remaining life exceeds the life threshold in the plurality of hard disks.

With reference to the second aspect, in some implementations of the second aspect, the target hard disk is the hard disk whose write speed exceeds the write performance threshold in the plurality of hard disks.

With reference to the second aspect, in some implementations of the second aspect, if the data has a read-hot attribute, the target hard disk is the hard disk whose read speed exceeds the read performance threshold in the plurality of hard disks.

Beneficial effects of any one of the second aspect or the possible implementations of the second aspect correspond to beneficial effects of any one of the first aspect or the possible implementations of the first aspect. Details are not described herein again.

According to a third aspect, a data storage apparatus is provided, including an input/output interface, a processor, and a memory. The processor is configured to control the input/output interface to send and receive information, the memory is configured to store a computer program, and the processor is configured to invoke the computer program from the memory and run the computer program, to enable the data storage apparatus to perform the method according to any one of the first aspect or the possible implementations of the first aspect.

Optionally, the processor may be a general-purpose processor, and may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a fourth aspect, a computer program product is provided. The computer program product includes computer program code. When the computer program code is run on a computer, the computer is enabled to perform the method according to any one of the first aspect or the possible implementations of the first aspect.

According to a fifth aspect, a computer-readable medium is provided. The computer-readable medium stores program code. When the computer program code is run on a computer, the computer is enabled to perform the method according to any one of the first aspect or the possible implementations of the first aspect.

According to a sixth aspect, a storage system is provided, including the foregoing data storage apparatus.

BRIEF DESCRIPTION OF DRAWINGS

FIG. 3 is a schematic block diagram of a running parameter of a hard disk according to an embodiment of this application;

FIG. 4 is a schematic block diagram of classifying hard disks into different levels based on remaining life according to an embodiment of this application; and FIG. 5 is a schematic block diagram of a data storage apparatus 500 according to an embodiment of this application.

DESCRIPTION OF EMBODIMENTS

The following describes technical solutions of this application with reference to accompanying drawings.

A storage system is an important part of a computing device. The storage system may provide a capability of writing information (for example, a program and data) for the computing device, or may further provide a capability of reading information (for example, a program and data) for the computing device, to implement an information storage function of the computing device.

Figure 1:
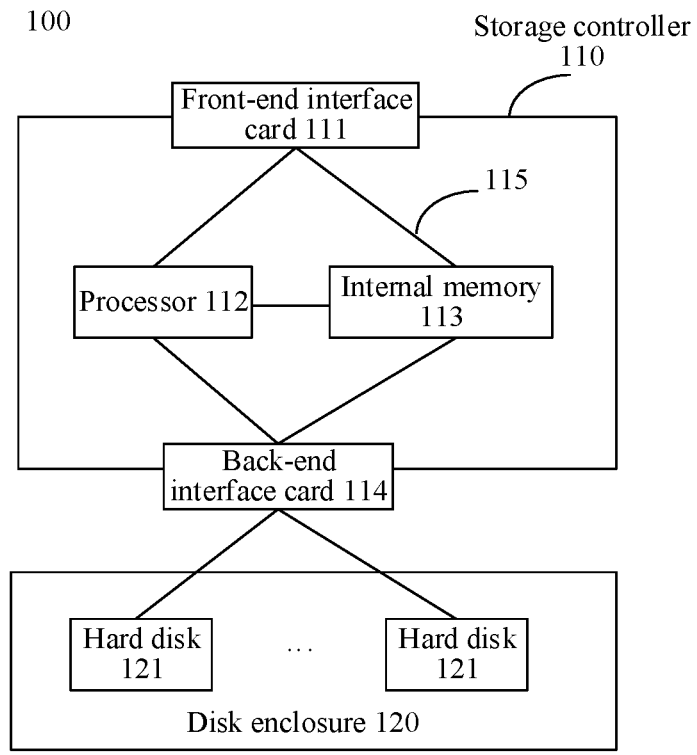
FIG. 1 is a schematic block diagram of a storage system 100 applied to an embodiment of this application.

FIG. 1 is a schematic block diagram of a storage system 100 applied to an embodiment of this application. As shown in FIG. 1, the storage system 100 may include a storage controller 110 and a disk enclosure 120.

The storage controller 110 may include a front-end interface card 111, a processor 112, an internal memory 113, and a back-end interface card 114. Optionally, the storage controller 110 may further include a bus 115. The front-end interface card 111, the processor 112, the internal memory 113, and the back-end interface card 114 may be connected by using the bus 115. The bus 115 may be a peripheral component interconnect express (PCIE) bus, an extended industry standard architecture (EISA) bus, or the like. The bus 115 may be classified into an address bus, a data bus, a control bus, and the like. For ease of representation, only one bold line is used for representation in FIG. 1, but this does not mean that there is only one bus or only one type of bus.

The front-end interface card 111 is configured to provide a storage service and an interface connection for a user who uses the storage system 100. In an example, the front-end interface card 111 may be configured to receive data sent by the user, and store the data in the internal memory 113 by using the bus 115.

The processor 112 is a computing core and a control core (a control unit) of the storage controller 110, and is configured to run a software program. For example, the processor 112 is configured to run a software program corresponding to the storage system 100. For example, in this embodiment of this application, the processor 112 may access the internal memory 113, and provide a classification and identification service for the data stored in the internal memory 113. For another example, the processor 112 may further access the disk enclosure 120 by using the back-end interface card 114, and provide a management service and the like for a hard disk included in the disk enclosure 120.

The processor 112 may include a plurality of processor cores. It may be understood that the core in the processor 112 may be, for example, a central processing unit (CPU). Alternatively, the core in the processor 112 may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

Optionally, an artificial intelligence (AI) chip (not shown in FIG. 1) may be further integrated into the storage controller 110. The AI chip may be a graphics processing unit (GPU) or a network processing unit (NPU). In this embodiment, the AI chip may be dedicated to identifying an attribute of data, to reduce burden on the processor 112. It should be understood that the data may be data input by a user. For example, in FIG. 1, the data is data received by the storage controller 110 by using the front-end interface card 111. The data may alternatively be data, for example, metadata and various intermediate data, generated inside the storage controller 110. This is not specifically limited in this application.

The internal memory 113 is used as a main memory of the storage controller 110, and is configured to store the software program running in the processor 112, an input/output (IO) command delivered by an upper-layer application, information exchanged with an external memory, and the like. To improve an access speed of the internal memory 113, the internal memory 113 needs to have an advantage of a high access speed. In some computer system architectures, a dynamic random access memory (DRAM) is used as the internal memory 113. The internal memory 113 has a memory controller (not shown in FIG. 1). The processor 112 can access the internal memory 113 by using the memory controller, and perform a read operation and a write operation on any memory cell in the internal memory 113. Optionally, when the AI chip is integrated into the storage controller 110, the AI chip may also access the internal memory 113.

It may be understood that the internal memory 113 in this embodiment of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through an example rather than a limitative description, random access memories (RAMs) in many forms may be used, for example, a storage class memory (SCM), static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

The back-end interface card 114 is configured to be connected to the disk enclosure 120. In an example, the back-end interface card 114 may store, in the disk enclosure 120, the data sent by the user.

The disk enclosure 120 may include a plurality of hard disks 121. The hard disk 121 mentioned in this application may be, for example, a solid-state drive (SSD), a hard disk drive (HDD), a serial advanced technology attachment (SATA) disk, a serial attached small computer system interface (SAS) disk, or a simple cached management medium. A same hard disk 121 may include one of the foregoing storage media. The same hard disk 121 may further include different storage media. This is not specifically limited in this application. It should be understood that, if the same hard disk 121 includes different storage media, each storage medium may be considered as a small disk, and use of the storage medium is the same as that of an independent hard disk.

A storage system uses a large quantity of hard disks to provide external data storage services. Therefore, efficient management and use of a plurality of hard disks is one of key technologies of the storage system. A related hard disk management solution is simple, and mainly implements classified management based on types of media of the plurality of hard disks. For example, the plurality of hard disks are classified into a solid-state drive, a mechanical hard disk, and the like based on types of the hard disks, and hard disks with different types of media are used to store different types of data. However, in the foregoing related technical solution, unified management and simple medium type classification of the plurality of hard disks cannot effectively distinguish between performance differences (the performance differences may include but are not limited to read/write performance, life, and the like of the hard disks) caused by individual differences of the plurality of hard disks during use. Consequently, utilization efficiency of the plurality of hard disks is reduced, and overall performance of the storage system is reduced.

In an example, reasons for the individual differences between the plurality of hard disks may include but are not limited to the following several cases.

(1) Types of media of the plurality of hard disks are the same, and vendors of the plurality of hard disks are different. That is, for hard disks with media of a same type, the hard disks produced by different vendors have specific performance differences. For example, although the hard disks with media of the same type have a same basic physical principle, the vendors have great differences in an implementation architecture, a production process, parameter adjustment, and the like. Consequently, technical specifications of the hard disks (such as read/write performance, life, and space of the hard disks) with media of the same type that are produced by the different vendors have great differences. In addition, it is common that hard disks from a plurality of vendors are used currently. Therefore, performance differences exist between the plurality of hard disks due to the individual differences.

For example, when the plurality of hard disks are all flash media, that types of media of the plurality of hard disks are the same includes: storage densities/granularities of minimum memory cells are the same. For example, when the plurality of hard disks are SSDs, a storage density/granularity of a minimum memory cell of the plurality of hard disks may be any one of the following: a single-level cell (SLC), a multi-level cell (MLC), a triple-level cell (TLC), a quad-level cell (QLC), or the like.

It should be understood that the SSD usually includes one or more flash memory chips, and each flash memory chip includes several erase blocks. Data is read from or written into the SSD on a page (page), but an erase operation can be performed only on one erase block. The erase operation is used to set all bits of the block to "1". Each erase block includes a plurality of pages. A memory cell (cell) is a minimum operation unit of a page. One memory cell is corresponding to one floating-gate transistor, and may store one or more bits (bits) of data. This depends on a flash memory type. Memory cells on one page share a character line. The memory cell includes a control grid and a floating gate, and the floating gate is a unit that actually stores the data. The data is stored in the memory cell in a form of an electrical charge. A quantity of stored electrical charges depends on a voltage applied to the control gate. The voltage controls the control gate to charge the electrical charge into the floating gate or to release the electrical charge from the floating gate. The data is represented by whether the voltage of the stored electrical charges exceeds a specific threshold. Writing the data into the floating gate is to apply a voltage to the control gate, so that enough electrical charges are stored in the floating gate. If the electrical charges exceed a threshold, the state is 0. Performing the erase operation on the flash memory is to discharge the floating gate, so that the electrical charges stored in the floating gate are lower than the threshold, and the state is 1.

It should be further understood that a type of a flash memory in which one bit of data is stored in one memory cell is referred to as an SLC. A floating gate of the SLC has one voltage threshold, and therefore has two states: 0 and 1, and can store one bit of data. The SLC flash memory has advantages of a high write speed, low power consumption, and longer battery life. Therefore, the SLC flash memory has a faster transmission speed and longer service life. An MLC is a memory cell that uses a plurality of voltage thresholds, so that a same quantity of transistors are allowed to store more bits. In an SLC technology, each memory cell can be in one of the two states. However, the MLC stores four possible states (where the MLC has four states: 00, 01, 10, and 11) in each memory cell, and therefore each memory cell may be used to store two bits. Compared with the SLC, the MLC has a higher bit error rate and shorter service life, but lower costs. Some SSDs use a portion of dies in an MLC flash memory to emulate as a single-bit SLC flash memory, to provide a higher write speed. In addition, a flash memory in which one cell stores three bits is referred to as a TLC, and the TLC has eight states. A disadvantage of the MLC also exists and is more prominent in the TLC, but the TLC also benefits from a higher storage density and lower costs. In addition, types of the flash memory include a QLC and other multi-level cells.

(2) Types of media and vendors of the plurality of hard disks are the same, and factory batches of the plurality of hard disks are different. For example, because a medium of each hard disk is actually obtained through quality control filtering and meets specific filtering logic, different batches of products from a same vendor may actually have large individual differences. These individual differences are further enlarged over time.

(3) Types of media, vendors, and factory batches of the plurality of hard disks are the same, and settings of the plurality of hard disks are different. For example, because a medium of each hard disk is actually obtained through quality control filtering and meets specific filtering logic, even if products are of a same batch and from a same vendor, different settings of hard disks cause large individual differences. These individual differences are further enlarged over time.

(4) Types of media, vendors, factory batches, and settings of the plurality of hard disks are the same, and use environments of the plurality of hard disks are different. In an example, a hard disk close to a heat source (for example, a CPU) and a hard disk close to a fan also have different performance. For example, the hard disk close to the fan should have longer life and better performance.

(5) Types of media, vendors, factory batches, settings, and use environments of the plurality of hard disks are the same, and the plurality of hard disks have performance differences during running. Due to differences in running time or service use of media, the plurality of hard disks may have performance differences during running. For example, media of a same type have different degrees of wear and capability drift over time. In particular, the longer the time, the greater the differences in aging degrees of different media, which also aggravates individual differences of the media used for long time. For another example, because data is stored and service access is performed on the media, data and service logic are different. Consequently, the media actually have large differences in performance during actual use. A difference caused by service use also causes a great difference in service capabilities that can be provided by media with similar physical capabilities. These differences cause a difference in service capabilities in a running mode.

In view of this, an embodiment of this application provides a data storage method, to effectively distinguish between performance differences (where the performance differences may include but are not limited to read/write performance, life, and the like of hard disks) caused by individual differences of a plurality of hard disks during use, so that utilization efficiency of the hard disks and overall performance of a storage system can be improved.

For example, the data storage method provided in this embodiment of this application may be applied to the storage system 100, or may be applied to the disk enclosure 120 (where for example, the disk enclosure 120 includes a hard disk, and further includes a processor and an internal memory), or may be applied to a server. This is not specifically limited in this application.

Figure 2:
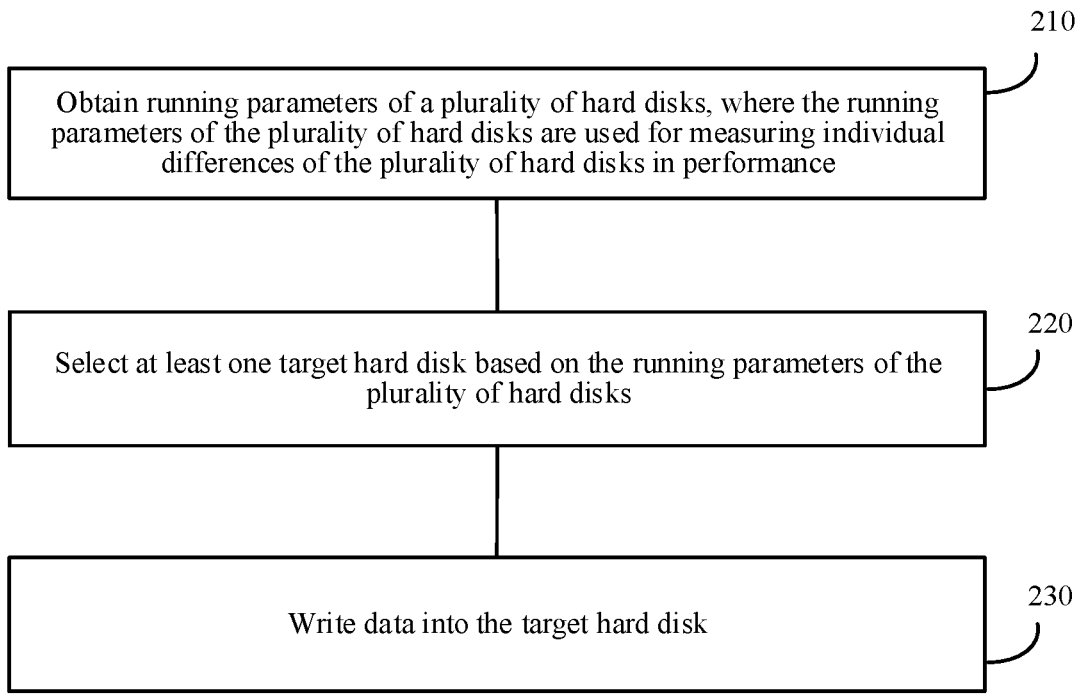
FIG. 2 is a schematic flowchart of a data storage method according to an embodiment of this application.

FIG. 2 is a schematic flowchart of a data storage method according to an embodiment of this application. For example, the data storage method is applied to the storage system 100. The method in FIG. 2 may be performed by the storage controller 110 shown in FIG. 1. The method in FIG. 2 may include steps 210 to 230. The following separately describes steps 210 to 230 in detail.

Step 210: Obtain running parameters of a plurality of hard disks, where the running parameters of the plurality of hard disks are used for measuring individual differences of the plurality of hard disks in performance.

The running parameters of the plurality of hard disks may be used for measuring the individual differences of the plurality of hard disks in performance. To be specific, the running parameters of the plurality of hard disks may be used for measuring performance differences caused by the individual differences of the plurality of hard disks during use. For a reason for causing the individual differences of the plurality of hard disks, refer to the foregoing descriptions. Details are not described herein again.

In an example, as shown in FIG. 3, the running parameter of the hard disk may include but is not limited to read/write performance of the hard disk and/or life of the hard disk. For example, the running parameter of the hard disk includes remaining life of the hard disk. Optionally, the running parameter of the hard disk may further include but is not limited to a combination of any one or more of the following: remaining space of the hard disk, a write speed of the hard disk, a read speed of the hard disk, input/output operations per second (input/output operations per second) of the hard disk, a throughput of the hard disk, or the like. The following describes some running parameters of the hard disk.

1. Remaining Life of the Hard Disk

The remaining life of the hard disk may also be referred to as remaining writable life of the hard disk. Life of a hard disk is related to an amount of data that has been written into the hard disk. The more the data written into the hard disk, the shorter the life. The less the data written into the hard disk, the longer the life. Herein, the amount of data that has been written into the hard disk cannot be simply equivalent to an occupied capacity of the hard disk. For example, if data is repeatedly written to a location (where the data is erased after being written, and then is written or overwritten to the original location), capacity consumption does not increase, but the life of the hard disk is shortened. Therefore, the remaining writable life of the hard disk may be obtained based on a remaining amount of data that can be written into the hard disk, and the remaining amount of data that can be written into the hard disk may be determined based on a total amount of data that can be written into the hard disk and the amount of data that has been written into the hard disk. For example, remaining amount of data that can be written into the hard disk=total amount of data that can be written into the hard disk—amount of data that has been written into the hard disk.

For example, the method in this embodiment of this application is applied to the storage controller 110. There are a plurality of specific implementations in which the storage controller 110 obtains the remaining life of the hard disk. In a possible implementation, the storage controller 110 may send instructions to the disk enclosure 120, to obtain an amount of data that has been written into each hard disk. After collecting the amount of data that has been written into each hard disk, the disk enclosure 120 reports the parameter to the storage controller 110. The storage controller 110 determines remaining life of each hard disk based on a total amount of data that can be written into each hard disk and the obtained amount of data that has been written into each hard disk. In another possible implementation, the storage controller 110 may further obtain, before step 210, the amount of data that has been written into each hard disk by using information actively reported by the disk enclosure 120, and determine the remaining life of each hard disk according to the foregoing method.

In an example, a device in the storage controller 110 may further maintain a table, and the table is used to record the remaining life of each hard disk. Optionally, the device in the storage controller 110 may further update, in a specific time period, the remaining life of each hard disk recorded in the table. It should be understood that a device that is in the storage controller 110 and that sends instructions to the plurality of hard disks included in the disk enclosure 120 to query for the amount of data that has been written into each hard disk and the device that maintains the foregoing table may be a same device or may be different devices in the storage controller 110. This is not specifically limited in this application.

For example, the method in this embodiment of this application is applied to the disk enclosure 120. A processor in the disk enclosure 120 may actively obtain an amount of data that has been written into each hard disk, determine remaining life of each hard disk according to the foregoing method, and record the remaining life of each hard disk in a table maintained by the disk enclosure 120.

It should be understood that the remaining life is for a hard disk, for example, an SSD or an SCM, that has a write life constraint. For a hard disk that is less subject to impact of the life, for example, an HDD, this parameter may not be considered, and remaining life of the hard disk with this type of medium is generally set to a large value.

2. Remaining Space of the Hard Disk

The remaining space of the hard disk may also be referred to as remaining writable space of the hard disk, that is, remaining writable free space of the hard disk, and may be determined based on total writable space of the hard disk (that is, a specification parameter of the hard disk) and used space of the hard disk. For example, remaining space of the hard disk=total writable space of the hard disk (that is, the specification parameter of the hard disk)—used space of the hard disk.

For example, the method in this embodiment of this application is applied to the storage controller 110. There are a plurality of specific implementations in which the storage controller 110 obtains the remaining space of the hard disk. In a possible implementation, the storage controller 110 may send instructions to the disk enclosure 120 to obtain used space of each hard disk. After collecting the used space of each hard disk, the disk enclosure 120 reports the parameter to the storage controller 110. The storage controller 110 determines remaining space of each hard disk based on total writable space of each hard disk (that is, a specification parameter of the hard disk) and the obtained used space of each hard disk. In another possible implementation, the storage controller 110 may further obtain, before step 210, the used space of each hard disk by using information actively reported by the disk enclosure 120, and determine the remaining space of each hard disk according to the foregoing method.

For example, a device in the storage controller 110 may further maintain a table, and the table is used to record the determined remaining space of each hard disk. Optionally, the device in the storage controller 110 may further update, in a specific time period, the remaining space of each hard disk recorded in the table. It should be understood that, a device that is in the storage controller 110 and that sends instructions to the plurality of hard disks included in the disk enclosure 120 to query for the used space of each hard disk and the device that maintains the foregoing table may be a same device or may be different devices in the storage controller 110. This is not specifically limited in this application.

For example, the method in this embodiment of this application is applied to the disk enclosure 120. A processor in the disk enclosure 120 may actively obtain used space of each hard disk, determine remaining space of each hard disk according to the foregoing method, and record the remaining space of each hard disk in a table maintained by the disk enclosure 120.

3. Write Speed of the Hard Disk

The write speed of the hard disk may also be referred to as write performance of the hard disk, that is, an amount of data written into the hard disk per second. For example, the method in this embodiment of this application is applied to the storage controller 110. The amount of data written into the hard disk per second may be estimated by the storage controller 110 based on an amount of data written into the hard disk per second in a historical time period. For example, the method in this embodiment of this application is applied to the disk enclosure 120. The amount of data written into the hard disk per second may be estimated by a processor in the disk enclosure 120 based on an amount of data written into the hard disk per second in a historical time period.

Optionally, in this application, the write performance of the hard disk may further be updated in a specific time period. In an example, the method in this embodiment of this application is applied to the storage controller 110. If a hard disk has large writing pressure in the specific time period (that is, usage of the hard disk exceeds a specified threshold), the storage controller 110 may predict current write performance of the hard disk based on recent historical performance of the hard disk. For example, a weighted historical average value (that is, an average value of write performance of the hard disk in a recent time period) and a historical write performance value that is added by proportion may be used to estimate the current write performance of the hard disk, to provide an estimated value of the write performance of the hard disk under actual service pressure. In another example, the method in this embodiment of this application is applied to the disk enclosure 120. If a hard disk has large writing pressure in the specific time period (that is, usage of the hard disk exceeds a specified threshold), the processor in the disk enclosure 120 may predict current write performance of the hard disk based on recent historical performance of the hard disk.

4. Read Speed of the Hard Disk

The read speed of the hard disk may also be referred to as read performance of the hard disk, that is, an amount of data read by the hard disk per second. For example, the method in this embodiment of this application is applied to the storage controller 110. The amount of data read by the hard disk per second may be estimated by the storage controller 110 based on an amount of data read by the hard disk per second in a historical time period. For example, the method in this embodiment of this application is applied to the disk enclosure 120. The amount of data read by the hard disk per second may be estimated by a processor in the disk enclosure 120 based on an amount of data read by the hard disk per second in a historical time period.

Optionally, in this application, the read performance of the hard disk may further be updated in a specific time period. In an example, the method in this embodiment of this application is applied to the storage controller 110. If usage of the hard disk is high in the specific time period (that is, the usage of the hard disk exceeds a specified threshold), the storage controller 110 may use a historical weighted average value of recent peak values of read performance of the hard disk as a read capability reference value. For example, read performance of the hard disk=read capability reference value of the hard disk—average value of recent read performance of the hard disk. It should be understood that the read capability reference value is a read capability basic value that can be provided by the hard disk of this type in a short term. In another example, the method in this embodiment of this application is applied to the disk enclosure 120.

If usage of the hard disk is high in the specific time period (that is, the usage of the hard disk exceeds a specified threshold), the processor in the disk enclosure 120 may use a historical weighted average value of recent peak values of read performance of the hard disk as a read capability reference value.

Step 220: Select at least one target hard disk based on the running parameters of the plurality of hard disks.

For example, the method in this embodiment of this application is applied to the storage controller 110. The storage controller 110 may select, based on the running parameters of the plurality of hard disks, the at least one target hard disk from the plurality of hard disks included in the disk enclosure 120. There are a plurality of specific implementations. This is not specifically limited in this application. In a possible implementation, the at least one target hard disk may be selected from the plurality of hard disks based on only the running parameters of the plurality of hard disks. In another possible implementation, the at least one target hard disk may alternatively be selected from the plurality of hard disks based on the running parameters of the plurality of hard disks and an attribute of data.

1. For example, the at least one target hard disk is selected based on only the running parameters of the plurality of hard disks.

In a possible implementation, the plurality of hard disks may be sorted based on different running parameters. In an example, the plurality of hard disks included in the disk enclosure 120 may be sorted based on remaining life of the hard disks. For example, a hard disk whose remaining life is longer (that is, a hard disk whose remaining life is longer in the sorting) or a hard disk whose remaining life reaches a specified life threshold may be used as the target hard disk. In another example, both the remaining life and write speeds of the hard disks may be considered. For example, a hard disk whose remaining life exceeds a life threshold and whose write speed also exceeds a write performance threshold may be used as the target hard disk. In another example, both the remaining life and read speeds of the hard disks may be considered. For example, a hard disk whose remaining life exceeds a life threshold and whose read speed also exceeds a read performance threshold is used as the target hard disk.

In another possible implementation, the target hard disk may be selected based on the running parameter of the hard disk and a threshold corresponding to the parameter. For example, when remaining life of a hard disk reaches a specified life threshold, the hard disk is used as the target hard disk. For another example, when a write speed of a hard disk reaches a specified write performance threshold, the hard disk is used as the target hard disk.

In another possible implementation, the running parameter of the hard disk may be classified into different levels, and each level may correspond to a parameter value in a specific range interval. In an example, the plurality of hard disks included in the disk enclosure 120 may be classified into different levels based on remaining life of the hard disks. For example, as shown in FIG. 4, the plurality of hard disks may be classified into three levels based on the remaining life (for example, a write amount or a remaining write amount that can be further borne by one or more hard disks included in a first level is less than or equal to 100 terabytes (terabytes, TB), a write amount or a remaining write amount that can be further borne by one or more hard disks included in a second level is greater than 100 TB and less than or equal to 500 TB, and a write amount or a remaining write amount that can be further borne by one or more hard disks included in a third level is greater than 500 TB), and the one or more hard disks included in the first level of remaining life are used as the target hard disk. In another example, the plurality of hard disks included in the disk enclosure 120 may be alternatively classified into different levels based on the write speeds of the hard disks. For example, the plurality of hard disks may be classified into three levels based on the write speeds (for example, a write speed of one or more hard disks included in a first level is 50 to 100 M/second, a write speed of one or more hard disks included in a second level is 101 to 151 M/second, and a write speed of one or more hard disks included in a third level is 152 to 202 M/second), and one or more hard disks included in both the first level of remaining life and the first level of write speeds are used as the target hard disk. In another example, the plurality of hard disks included in the disk enclosure 120 may be alternatively classified into different levels based on read speeds of the hard disks. For example, the plurality of hard disks may be classified into three levels based on the read speeds (for example, a read speed of one or more hard disks included in a first level is 50 to 100 M/second, a read speed of one or more hard disks included in a second level is 101 to 151 M/second, and a read speed of one or more hard disks included in a third level is 152 to 202 M/second), and one or more hard disks included in the first level of remaining life, the first level of write speeds, and the first level of read speeds are used as the target hard disk.

It should be noted that, the classifying the running parameter into different levels may also be understood as that the plurality of hard disks included in the disk enclosure 120 are classified into different levels based on different thresholds of the running parameter. For example, a first remaining life threshold is 100 TB, and one or more hard disks whose remaining write amount is not greater than 100 TB may be classified into a first level. For another example, a second remaining life threshold is 500 TB, and one or more hard disks whose remaining write amount is not less than 100 TB and not greater than 500 TB may be classified into a second level. For another example, one or more hard disks whose remaining write amount is not less than 500 TB may be further classified into a third level.

2. For example, the at least one target hard disk is selected based on the running parameters of the plurality of hard disks and the attribute of data.

It should be understood that the attribute of data may be understood as a possibility that the data is read or written after being written into a corresponding hard disk. In an example, the data may be classified into: write-hot data, write-cold data, read-hot data, read-cold data, and the like based on the attribute of the data and a prediction result indicating that the data is accessed again in a specific time period. The write-hot data may also be referred to as that the data has a write-hot attribute, and indicates that after the data is written into a hard disk, there is a high probability that the data is expected to be modified or deleted again within a specified time range. The write-cold data indicates that after the data is written into a hard disk, there is a low probability that the data is expected to be modified or deleted again in the specified time range. The read-hot data may also be referred to as that the data has a read-hot attribute, and indicates that a period from a time when the data is read most recently is less than a specified period threshold, and the data is read again in the specified time range. The read-cold data indicates that a period from a time when the data is read most recently exceeds the specified period threshold, and the data is not read again in the specified time range. The specified time range and the specified period threshold may be adjusted through configuration. In addition, the classification of data based on the attribute may be classification based on more granularities. For ease of description, classification based on the foregoing four attributes is used in this embodiment.

The data may be data input by a user. For example, in FIG. 1, the data is data received by the storage controller 110 by using the front-end interface card 111. The data may alternatively be data, for example, metadata and various intermediate data, generated inside the storage controller 110. This is not specifically limited in this application. For example, the data storage method is applied to the storage system 100. In an implementation, the processor 112 in the storage controller 110 may identify the attribute of data. In another implementation, an AI chip in the storage controller 110 may further classify and identify the data by using an artificial intelligence (artificial intelligence, AI) technology. It should be understood that the classifying and identifying the data by using the AI technology is actually a prediction of future access behavior based on statistics of historical access to the data. For example, the AI technology may be used to collect statistics on locations of read/write accesses to the data, historical behavior at a similar location, a relationship between space and time of a plurality of the read/write accesses, and the like. In addition, a model is established based on the statistics information. In a subsequent data access, subsequent possible behavior of the data access may be predicted, that is, an attribute of the data is predicted based on the model.

In a possible implementation, the plurality of hard disks may be sorted based on different running parameters. In an example, the plurality of hard disks included in the disk enclosure 120 may be sorted based on remaining life of the hard disks. For example, if a piece of data is write-hot data, a hard disk whose remaining life is longer (that is, a hard disk whose remaining life is longer in the sorting) or a hard disk whose remaining life reaches a specified life threshold may be used as the target hard disk. In another example, both the remaining life and write speeds of the hard disk may be considered. For example, a hard disk whose remaining life exceeds a life threshold and whose write speed also exceeds a write performance threshold is used as the target hard disk. In another example, both the remaining life and read speeds of the hard disk may be considered. For example, a hard disk whose remaining life exceeds a life threshold and whose read speed also exceeds a read performance threshold is used as the target hard disk.

In another possible implementation, the target hard disk may be selected based on the running parameter of the hard disk and a threshold corresponding to the parameter. For example, when remaining life of a hard disk reaches a specified life threshold, the hard disk is used as the target hard disk. For another example, when a write speed of a hard disk reaches a specified write performance threshold, the hard disk is used as the target hard disk.

In another possible implementation, the running parameter of the hard disk may be classified into different levels, and each level may correspond to a parameter value in a specific range interval. In an example, the plurality of hard disks included in the disk enclosure 120 may be classified into different levels based on the remaining life of the hard disks. For example, as shown in FIG. 4, if the data is write-hot data, one or more hard disks whose remaining life is corresponding to a highest level may be used as the target hard disk. Alternatively, one or more hard disks included in both the highest level corresponding to the remaining life and a highest level corresponding to the write speeds may be used as the target hard disk. Alternatively, one or more hard disks included in both the highest level corresponding to the remaining life and a highest level corresponding to the read speeds may be used as the target hard disk.

It should be understood that, regardless of which manner is used to select the target hard disk, remaining space of the selected target hard disk needs to be not less than an amount of data to be written.

Step 230: Write data into the target hard disk.

For example, the method in this embodiment of this application is applied to the storage controller 110. After determining the target hard disk, the storage controller 110 may write the data into the corresponding target hard disk. Specifically, in an example, the storage controller 110 in FIG. 1 may obtain a write request delivered by a user by using the front-end interface card 111, and the write request may include but is not limited to: to-be-written data and a logical address for storing the data. After determining the target hard disk, the storage controller 110 may store the data in the write request in the corresponding target hard disk, and establish and store a mapping relationship between the logical address of the data and a physical address of the target hard disk. The physical address of the target hard disk may be, for example, an identifier of the target hard disk and/or a location at which the data is written into the target hard disk.

It should be noted that the storage controller 110 may establish a direct mapping relationship between the logical address of the data and the physical address of the target hard disk, or may establish one-level or multi-level mapping between the logical address of the data and another address, and then establish a mapping relationship between the another address and the physical address of the target hard disk. This is not specifically limited in this application.

In the foregoing technical solution, the performance differences caused by the individual differences between the plurality of hard disks during use can be effectively distinguished, so that the utilization efficiency of the hard disks and the overall performance of the storage system can be improved.

Optionally, in some embodiments, data stored in a hard disk may be further migrated by using the data storage method according to this embodiment of this application. Therefore, after the data is migrated, the individual differences between the hard disks can be effectively distinguished, to avoid unnecessary replacement of a hard disk, improve the utilization efficiency of the hard disks, and therefore improve the overall performance of the storage system.

With reference to a specific example, the following describes in detail a specific implementation process of selecting the at least one target hard disk from the plurality of hard disks based on the attribute of the data and the running parameters of the plurality of hard disks in step 220. It should be noted that examples below are merely intended to help a person skilled in the art understand embodiments of this application, but are not intended to limit embodiments of this application to a specific value or a specific scenario shown in the examples. A person skilled in the art can definitely make various equivalent modifications or changes based on the examples shown below, and such modifications and changes also fall within the scope of embodiments of this application.

In an example, for write-hot data, a hard disk whose remaining life exceeds a life threshold may be preferentially selected from the plurality of hard disks as the target hard disk. For read-hot data, a hard disk whose read speed exceeds a read performance threshold may be preferentially selected as the target hard disk.

In an implementation of this embodiment, when a hard disk used to store data is selected, an attribute of the data and a running parameter of the hard disk are comprehensively considered. For example, if the attribute of the data is write-hot and read-hot, a specific implementation process of selecting the at least one target hard disk is described in detail. It should be understood that, the write-hot and read-hot data indicates that after the data is written into a hard disk, there is a high probability that the data is expected to be modified or deleted again in a specified time range, a period from a time when the data is read most recently is less than a specified period threshold, and the data is read again in the specified time range.

Firstly, based on a data capacity, a plurality of hard disks whose remaining space is not less than the data capacity may be selected from a plurality of hard disks included in a disk enclosure, and the plurality of hard disks form a first hard disk set. That is, remaining space of each hard disk in the first hard disk set is not less than the data capacity. Secondly, when it is determined that the attribute of the data is write-hot, a plurality of hard disks whose remaining life is long are selected from the plurality of hard disks included in the first hard disk set, the plurality of hard disks form a second hard disk set, and the second hard disk set is a subset of the first hard disk set. Remaining life of each hard disk in the second hard disk set is greater than the life threshold.

In the foregoing technical solution, data with a write-hot attribute may be written into a hard disk whose life is long. In this way, overall life of a storage system can be prolonged.

Optionally, the storage controller 110 may further select a plurality of hard disks whose write speeds are high from the second hard disk set, the plurality of hard disks form a third hard disk set, and the third hard disk set is a subset of the second hard disk set. That is, a write speed of each hard disk in the third hard disk set is higher than a write performance threshold. Certainly, in this embodiment, the third hard disk set with a high write speed may be directly selected from the first hard disk set without considering the remaining life of the hard disks. One or more hard disks in the third hard disk set store the data.

Optionally, when the data is read-hot data, the storage controller 110 may further select a plurality of hard disks whose read speeds are high from the third hard disk set based on a read-hot characteristic of the data, and the plurality of hard disks may form a fourth hard disk set. That is, a read speed of each hard disk in the fourth hard disk set is higher than a read performance threshold. The data may be stored in the target hard disk. In this way, when the target hard disk is selected, reading of the data after the data is written into the target hard disk is further considered, so that overall performance of the storage system can be further improved.

In addition, in this embodiment, the fourth hard disk set with a high read speed may be directly selected from the second hard disk set without considering write speeds of the hard disks. Even, neither the remaining life of the hard disks nor the write speeds of the hard disks are considered, and the fourth hard disk set with the high read speed is directly selected from the first hard disk set. In this way, a read speed of the selected target hard disk is high. For data having the read-hot characteristic, performance of subsequently reading the data from the target hard disk can be improved, and therefore the overall performance of the storage system is further improved.

In another implementation of this embodiment, when a hard disk used to store data is selected, an attribute of the data and a running parameter of the hard disk are comprehensively considered. For example, if the attribute of the data is write-hot and read-cold, a specific implementation process of selecting the at least one target hard disk is described in detail. It should be understood that, the write-hot and read-cold data indicates that after the data is written into a hard disk, there is a high probability that the data is expected to be modified or deleted again in a specified time range, a period from a time when the data is read most recently exceeds a specified period threshold, and the data is not read again in the specified time range.

Firstly, based on a data capacity, a plurality of hard disks whose remaining space is not less than the data capacity may be selected from a plurality of hard disks included in a disk enclosure, and the plurality of hard disks form a first hard disk set. The first hard disk set is consistent with that described above, and details are not described herein again. Secondly, if the attribute of the data is a write-hot characteristic, a plurality of hard disks whose remaining life is long are selected from the plurality of hard disks included in the first hard disk set, and the plurality of hard disks form a second hard disk set. The second hard disk set is consistent with that described above.

Optionally, the storage controller 110 may further select a plurality of hard disks whose write speeds are high from the second hard disk set, and the plurality of hard disks form a third hard disk set. Certainly, in this embodiment, the third hard disk set with a high write speed may be directly selected from the first hard disk set without considering the remaining life of the hard disks. One or more hard disks in the third hard disk set store the data. The third hard disk set is consistent with that described above.

Optionally, if the storage controller 110 further determines that the attribute of the data is a read-cold characteristic, the storage controller 110 further selects a plurality of hard disks whose read speeds are low from the third hard disk set, and the plurality of hard disks may form a fourth hard disk set. That is, a read speed of a hard disk included in the fourth hard disk set is less than a read performance threshold. The hard disk included in the fourth hard disk set may be used as the target hard disk, and the foregoing data may be stored in the target hard disk. In this way, when the target hard disk is selected, reading of the data after the data is written into the target hard disk is further considered, the data whose attribute is the read-cold characteristic is stored in the hard disk whose read speed is less than the read performance threshold, and a hard disk whose read speed is greater than the read performance threshold is reserved for storing data whose attribute is a read-hot characteristic, so that overall performance of the storage system is further improved.

In addition, in this embodiment, the fourth hard disk set with a low read speed may be directly selected from the second hard disk set without considering write speeds of the hard disks. Even, neither the remaining life of the hard disks nor the write speeds of the hard disks are considered, and the fourth hard disk set with the low read speed is directly selected from the first hard disk set.

In another implementation of this embodiment, when a hard disk used to store data is selected, an attribute of the data and a running parameter of the hard disk are comprehensively considered. For example, if the attribute of the data is write-cold and read-hot data, a specific implementation process of selecting the at least one target hard disk is described in detail. It should be understood that, the write-cold and read-hot data indicates that after the data is written into a hard disk, there is a low probability that the data is expected to be modified or deleted again in a specified time range, a period from a time when the data is read most recently is less than a specified period threshold, and the data is read again in the specified time range.

Firstly, based on a data capacity, a plurality of hard disks whose remaining space is not less than the data capacity may be selected from a plurality of hard disks included in a disk enclosure, and the plurality of hard disks may form a first hard disk set. That is, remaining space of a hard disk included in the first hard disk set is not less than the data capacity. Secondly, a plurality of hard disks whose remaining life is short may be selected from the plurality of hard disks included in the first hard disk set based on a write-cold characteristic of the data, and the plurality of hard disks form a second hard disk set. The second hard disk set is a subset of the first hard disk set. Remaining life of a hard disk included in the second hard disk set is less than the life threshold.

Optionally, the storage controller 110 may further select a plurality of hard disks whose write speeds are high from the second hard disk set, the plurality of hard disks form a third hard disk set, and the third hard disk set is a subset of the second hard disk set. That is, a write speed of each hard disk in the third hard disk set is higher than a write performance threshold. Certainly, in this embodiment, the third hard disk set with a high write speed may be directly selected from the first hard disk set without considering the remaining life of the hard disks. One or more hard disks in the third hard disk set store the data. The third hard disk set is consistent with that described above.

Optionally, if the storage controller 110 further determines that the attribute of the data is read-hot, the storage controller 110 further selects a plurality of hard disks whose read speeds are high from the third hard disk set, and the plurality of hard disks may form a fourth hard disk set. That is, a read speed of each hard disk in the fourth hard disk set is higher than a read performance threshold.

In addition, in this embodiment, the fourth hard disk set with a high read speed may be directly selected from the second hard disk set without considering write speeds of the hard disks. Even, neither the remaining life of the hard disks nor the write speeds of the hard disks are considered, and the fourth hard disk set with the high read speed is directly selected from the first hard disk set.

In another implementation of this embodiment, when a hard disk used to store data is selected, an attribute of the data and a running parameter of the hard disk are comprehensively considered. For example, the attribute of the data is write-cold and read-cold. A specific implementation process of selecting the at least one target hard disk is described in detail. It should be understood that the write-cold and read-cold data indicates that after the data is written into a hard disk, there is a low probability that the data is expected to be modified or deleted again in a specific time range, a period from a time when the data is read most recently exceeds a specified period threshold, and the data is not read again in the specified time range.

Firstly, based on a data capacity, a plurality of hard disks whose remaining space is not less than the data capacity may be selected from a plurality of hard disks included in a disk enclosure, and the plurality of hard disks may form a first hard disk set. The first hard disk set is consistent with that described above, and details are not described herein again. Secondly, if the attribute of the data is a write-cold characteristic, a plurality of hard disks whose remaining life is short are selected from the plurality of hard disks included in the first hard disk set, and the plurality of hard disks may form a second hard disk set. That is, remaining life of a hard disk included in the second hard disk set is less than the life threshold.

Optionally, the storage controller 110 may further select a plurality of hard disks whose write speeds are high from the second hard disk set, and the plurality of hard disks form a third hard disk set. Certainly, in this embodiment, the third hard disk set with a high write speed may be directly selected from the first hard disk set without considering the remaining life of the hard disks. One or more hard disks in the third hard disk set store the data. The third hard disk set is consistent with that described above.

Optionally, if the storage controller 110 further determines that the attribute of the data is a read-cold characteristic, the storage controller 110 further selects a plurality of hard disks whose read speeds are low from the third hard disk set, and the plurality of hard disks may form a fourth hard disk set. That is, a read speed of a hard disk included in the fourth hard disk set is less than a read performance threshold. The hard disk included in the fourth hard disk set may be used as the target hard disk, and the foregoing data may be stored in the target hard disk.

In addition, in this embodiment, the fourth hard disk set with a low read speed may be directly selected from the second hard disk set without considering write speeds of the hard disks. Even, neither the remaining life of the hard disks nor the write speeds of the hard disks are considered, and the fourth hard disk set with the low read speed is directly selected from the first hard disk set.

In the foregoing technical solution, the target hard disk may be selected based on the attribute of the data, so that the individual differences between the hard disks can be better distinguished, the utilization efficiency of the hard disks is improved, and therefore the overall performance of the storage system is improved.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

The data storage method provided in embodiments of this application is described in detail above with reference to FIG. 1 to FIG. 4. An embodiment of a data storage apparatus in this application is described in detail below with reference to FIG. 5. It should be understood that the descriptions of the method embodiments correspond to descriptions of the apparatus embodiments. Therefore, for parts that are not described in detail, refer to the descriptions in the foregoing method embodiments.

FIG. 5 is a schematic block diagram of a data storage apparatus 500 according to an embodiment of this application. The data storage apparatus 500 may include an obtaining module 510, a selection module 520, and a storage module 530.

The obtaining module 510 is configured to obtain running parameters of a plurality of hard disks. The running parameters of the plurality of hard disks are used for measuring individual differences of the plurality of hard disks in performance.

The selection module 520 is configured to select at least one target hard disk based on the running parameters of the plurality of hard disks.

The storage module 530 is configured to write data into the target hard disk.

Optionally, the individual differences of the plurality of hard disks in performance result from any one of the following several cases:

Types of media of the plurality of hard disks are the same, and vendors of the plurality of hard disks are different;

types of media and vendors of the plurality of hard disks are the same, and factory batches of the plurality of hard disks are different;

types of media, vendors, and factory batches of the plurality of hard disks are the same, and settings of the plurality of hard disks are different;

types of media, vendors, factory batches, and settings of the plurality of hard disks are the same, and use environments of the plurality of hard disks are different; or types of media, vendors, factory batches, settings, and use environments of the plurality of hard disks are the same, and the plurality of hard disks have performance differences during running.

Optionally, when the plurality of hard disks are all flash media, that types of media are the same includes: storage densities/granularities of minimum memory cells are the same.

Optionally, the performance includes read/write performance and/or life.

Optionally, the running parameter of the hard disk includes a combination of any one or more of the following: remaining space of the hard disk, remaining life of the hard disk, a write speed of the hard disk, or a read speed of the hard disk.

Optionally, the target hard disk is a hard disk whose remaining life exceeds a life threshold in the plurality of hard disks.

Optionally, the target hard disk is a hard disk whose write speed exceeds a write performance threshold in the plurality of hard disks.

Optionally, the target hard disk is a hard disk whose read speed exceeds a read performance threshold in the plurality of hard disks.

Optionally, the selection module 520 is specifically configured to select the at least one target hard disk from the plurality of hard disks based on the running parameters of the plurality of hard disks and an attribute of the data.

Optionally, if the data has a write-hot attribute, the target hard disk is the hard disk whose remaining life exceeds the life threshold in the plurality of hard disks.

Optionally, the target hard disk is the hard disk whose write speed exceeds the write performance threshold in the plurality of hard disks.

Optionally, if the data has a read-hot attribute, the target hard disk is the hard disk whose read speed exceeds the read performance threshold in the plurality of hard disks. The foregoing modules may be executed by the processor 112 in the controller shown in FIG. 1, or may be executed by the processor 112 by invoking the software program in the internal memory 113. Alternatively, the foregoing modules may be executed by the processor in the disk enclosure 120 shown in FIG. 1, or may be executed by the processor by invoking the software program in the internal memory.

A person of ordinary skill in the art may be aware that, in combination with units and algorithm steps of the examples described in embodiments disclosed in this specification, this application may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in embodiments of this application. The foregoing storage medium includes any medium, such as a USB flash drive, a removable hard disk, a read-only memory (ROM), a random access memory (RAM), a magnetic disk, or an optical disc, that can store program code.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data storage method, comprising:
obtaining running parameters of a plurality of storage devices, wherein the running parameters of the plurality of storage devices comprise information for measuring individual differences of the plurality of storage devices in performance, wherein the individual differences of the plurality of storage devices in performance comprise at least one of the following:
types of media, vendors, and factory batches of the plurality of storage devices are the same, and settings of the plurality of storage devices are different;
types of media, vendors, factory batches, and settings of the plurality of storage devices are the same, and use environments of the plurality of storage devices are different; or
types of media, vendors, factory batches, settings, and use environments of the plurality of storage devices are the same, and the plurality of storage devices have performance differences during running;
selecting at least one target storage device based on the running parameters of the plurality of storage devices; and
writing data into the target storage device.

2. The method according to claim 1, wherein when the plurality of storage devices are flash media, that types of media are the same comprises: storage densities and granularities of minimum memory cells are the same.

3. The method according to claim 1, wherein the performance comprises at least one of read performance, write performance, or life.

4. The method according to claim 1, wherein the running parameters comprise at least one of the following: remaining space of a storage device, remaining life of a storage device, a write speed of a storage device, or a read speed of a storage device.

5. The method according to claim 1, wherein the target storage device is a storage device whose remaining life exceeds a life threshold in the plurality of storage devices.

6. The method according to claim 5, wherein the target storage device is a storage device whose write speed exceeds a write performance threshold in the plurality of storage devices.

7. The method according to claim 6, wherein the target storage device is a storage device whose read speed exceeds a read performance threshold in the plurality of storage devices.

8. The method according to claim 1, wherein the selecting at least one target storage device based on the running parameters of the plurality of storage devices comprises:
selecting the at least one target storage device from the plurality of storage devices based on the running parameters of the plurality of storage devices and an attribute of the data.

9. The method according to claim 8, wherein when the data has a write-hot attribute, the target storage device is a storage device whose remaining life exceeds a life threshold in the plurality of storage devices.

10. The method according to claim 9, wherein the target storage device is the storage device whose write speed exceeds a write performance threshold in the plurality of storage devices.

11. The method according to claim 8, wherein when the data has a read-hot attribute, the target storage device is a storage device whose read speed exceeds a read performance threshold in the plurality of storage devices.

12. A storage system, comprising:
an input/output interface; and
at least one processor coupled to the input/output interface and configured to:
obtain running parameters of a plurality of storage devices, wherein the running parameters of the plurality of storage devices comprise information for measuring individual differences of the plurality of storage devices in performance, wherein the individual differences of the plurality of storage devices in performance comprise at least one of the following:
types of media, vendors, and factory batches of the plurality of storage devices are the same, and settings of the plurality of storage devices are different;
types of media, vendors, factory batches, and settings of the plurality of storage devices are the same, and use environments of the plurality of storage devices are different; or
types of media, vendors, factory batches, settings, and use environments of the plurality of storage devices are the same, and the plurality of storage devices have performance differences during running;
select at least one target storage device based on the running parameters of the plurality of storage devices; and
write data into the target storage device.

13. The storage system according to claim 12, wherein when the plurality of storage devices, that types of media are the same comprises: storage densities and granularities of minimum memory cells are the same.

14. The storage system according to claim 12, wherein the performance comprises at least one of read performance, write performance, or life.

15. The storage system according to claim 12, wherein the running parameters comprise at least one of the following: remaining space of a storage device, remaining life of a storage device, a write speed of a storage device, or a read speed of a storage device.

16. The storage system according to claim 12, wherein the target storage device is a storage device whose remaining life exceeds a life threshold in the plurality of storage devices.

17. The storage system according to claim 16, wherein the target storage device is a storage device whose write speed exceeds a write performance threshold in the plurality of storage devices.

18. The storage system according to claim 17, wherein the target storage device is a storage device whose read speed exceeds a read performance threshold in the plurality of storage devices.

19. One or more non-transitory computer-readable media storing computer instructions, that when executed by one or more processors, cause a computing device to perform operations comprising:
obtaining running parameters of a plurality of storage devices, wherein the running parameters of the plurality of storage devices comprise information for measuring individual differences of the plurality of storage devices in performance, wherein the individual differences of the plurality of storage devices in performance comprise at least one of the following:
types of media, vendors, and factory batches of the plurality of storage devices are the same, and settings of the plurality of storage devices are different;
types of media, vendors, factory batches, and settings of the plurality of storage devices are the same, and use environments of the plurality of storage devices are different; or types of media, vendors, factory batches, settings, and use environments of the plurality of storage devices are the same, and the plurality of storage devices have performance differences during running;
selecting at least one target storage device based on the running parameters of the plurality of storage devices; and
writing data into the target storage device.

* * * * *